United States Patent Office 3,095,498
Patented June 25, 1963

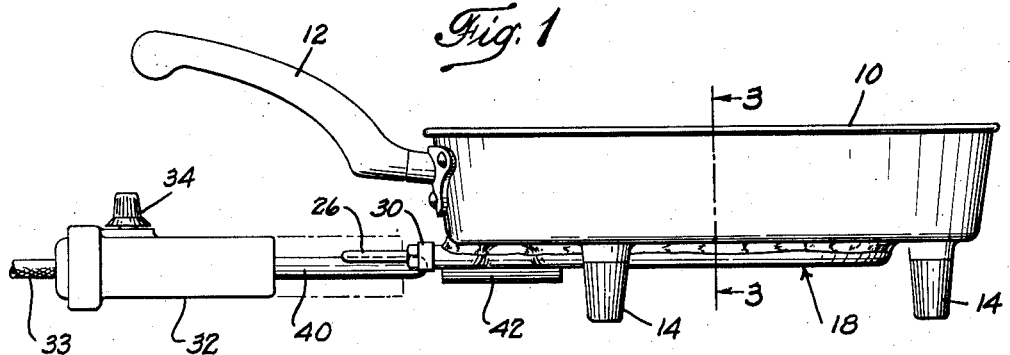
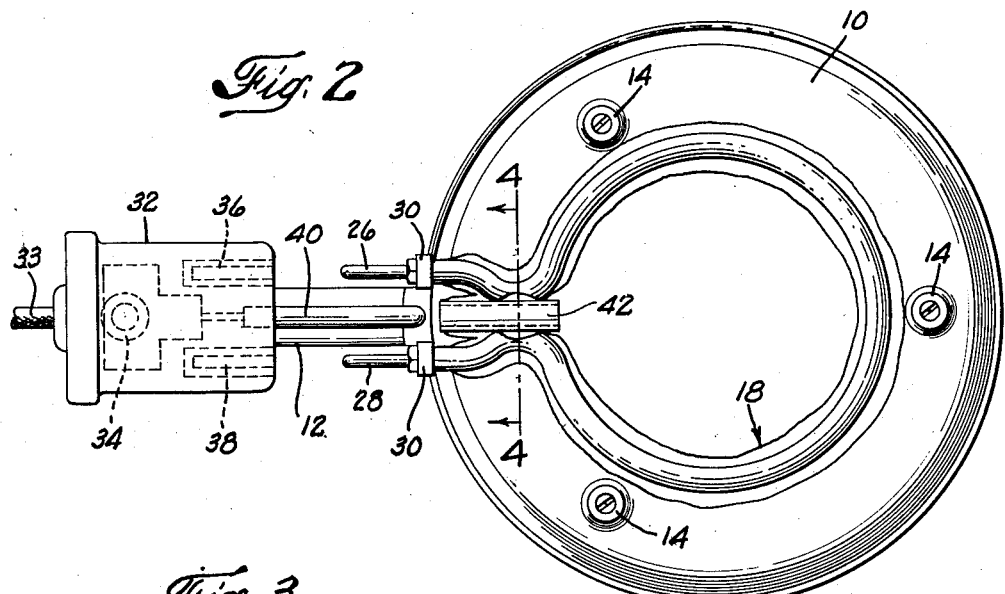
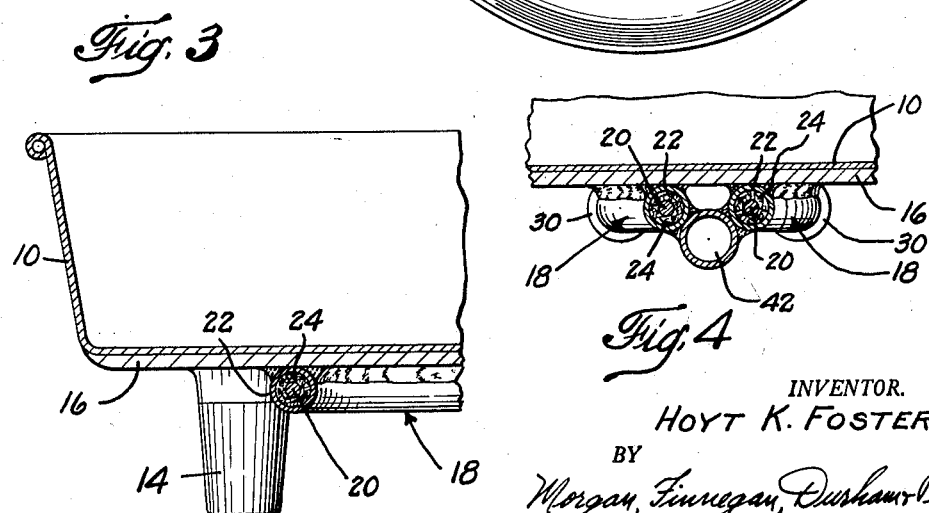
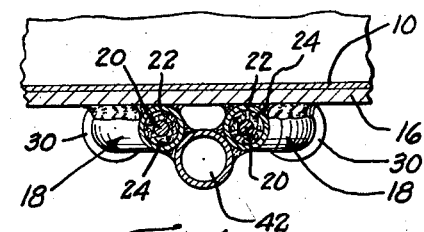

3,095,498
ELECTRIC COOKING UTENSIL HAVING A DETACHABLE THERMOSTATIC CONTROL MEANS
Hoyt K. Foster, Hollis, N.Y., assignor to S. W. Farber, Inc., New York, N.Y., a corporation of New York
Filed Nov. 30, 1954, Ser. No. 471,949
15 Claims. (Cl. 219—44)

This invention relates to cooking utensils and specifically to an improved cooking utensil having an electrical heater secured thereto and provided with an adjustable thermostatic control for said heater.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

In the drawings:

FIGURE 1 is an elevational view of the cooking utensil of the present invention with the adjustable thermostatic control being disconnected from the heating element that is secured to the bottom of the utensil;

FIGURE 2 is an elevational view of the bottom of the utensil showing the particular configuration of the heating element and again showing the thermostatic control in its disconnected position;

FIGURE 3 is a fragmentary transverse sectional view taken generally along line 3—3 of FIGURE 1 and showing the detailed construction of the utensil and the heating element; and FIGURE 4 is a sectional view taken along line 4—4 of FIGURE 2 showing the disposition of the housing for the thermostatic element of the control with relation to the heating element and the bottom of the cooking utensil.

The present invention has for its object the provision of an improved electrically heated cooking utensil which may be completely immersed in water for washing purposes without injury to the electrical heating mechanism. It is a further object of this invention to provide a cooking utensil having a waterproof heater secured thereto and provided with a thermostatic control for the heater which may be readily removed when desired. A still further object of this invention is to provide an improved electrical cooking utensil having a readily detachable thermostatic control for the heater through which the heater is connected to a source of electrical energy and with the thermostatic element of the control being primarily responsive to the temperature of the heater in order to effect a more even control of the utensil and the contents thereof. Another object of the invention is to provide an electrical cooking utensil which is evenly heated throughout the area of its bottom and which is simple and economical to manufacture yet highly reliable in operation.

In accordance with the present invention the cooking utensil, which may take any of a variety of forms for a variety of uses such as a frying pan, dutch oven, sauce pan, stew pot, deep fat dryer, griddle, etc., comprises a container or shell having a substantially flat circular bottom with the shell preferably being fabricated of stainless steel and provided with a thick cladding or facing of aluminum securely bonded to the outer surface of the stainless steel throughout the area of the bottom of the container. Heat is supplied to the container by means of an electrical heater which preferably takes the form of a single conductor positioned within and electrically insulated from a metallic tube with the conductor and tube being bent generally in a circle of substantially smaller diameter than the bottom of the container and with the terminals of the conductor extending outwardly of this circle and forming a pair of parallel spaced prongs. This heating element is mounted on the bottom of the container in concentric relation therewith and with the outertube being welded, brazed, or otherwise bonded to the bottom of the container. This heating element is of waterproof construction so that it may be immersed in water without injury to the heater. The heater is connected to a source of electrical energy and the output of the heater is regulated by means of a thermostatic control device connected to the heater and for this purpose being provided with a pair of recesses or receptacles complementary with the prongs formed on the terminal ends of the heating element for receiving the same therewithin in the conventional plug fashion and thereby establishing a readily removable electrical connection between the control device and the heating element. The temperature sensitive means of the control device is received within a housing which is secured to the heating element but spaced from the bottom of the container when the control device is in its operative position whereby the control device is effective to regulate the output of the heater.

It will be understood that the foregoing general description and the following detailed description as well are exemplary and explanatory of the invention but are not restrictive thereof.

Referring now to the drawings wherein like reference characters designate like elements throughout and wherein for the purposes of explanation and illustration the frying pan embodiment of the invention is illustratively disclosed, the reference numeral 10 designates the generally cylindrical shell or body of the frying pan from which extends the handle 12 and which is provided with feet or legs 14 the lower portion of which are preferably a heat resistant plastic or similar material providing low heat conductivity. The shell 10 is fabricated of stainless steel and has a relatively thick slab or layer 16 of aluminum securely bonded to the outer surface of the bottom.

Heat is supplied to the frying pan by the heating element 18 which is of waterproof construction and is securely bonded to the bottom of the frying pan. This heating element comprises a conductor 20 which is positioned within an aluminum sheath or tube 22 and insulated therefrom by means of a layer of magnesia cement 24. The terminal ends 26 and 28 of the conductor 20 extend out from tube 22 and form the prongs of a plug type electrical connection with the heating element being made watertight by means of the nuts 30 threaded on the ends of tube 22 with the nuts being constructed in the nature of and performing the function of a stuffing box preventing the seepage of water into the tube 22 and thereby preventing breakdown of the electrical insulation 24.

The electrical heater is controlled by the thermostatic control device 32 which is also effective to connect the heater with a source of electrical potential through electrical cord 33. This control device may be operated in any conventional manner such as by means of a bimetal element or an expansible fluid and a bellows and is preferably of the "on-off" type with the adjustment of the device being effected by means of knob 34. This control device includes a pair of recesses or receptacles 36 and 38 which are adapted to frictionally receive the terminal ends 26 and 28, respectively, of the heating element 18 in the ordinary electrical plug fashion thereby establishing a readily removable electrical connection between the control device and the heating element. The temperature sensitive element of the control device is contained within tube 40 which extends outwardly from the housing of the control device and when the device is in its "plugged in" position with the terminal ends 26 and 28 received within recesses 36 and 38, tube 40 is positioned within metallic housing 42 which is bonded to and in heat conducting relation with the closely adjacent end portions of heating element 18 as shown in FIG. 2 but is spaced from aluminum layer 16 on the bottom of the frying pan. The temperature sensitive element thus responds primarily to the heating element 18 rather than primarily to the temperature of the frying pan itself which results in the contacts of the thermostat being moved from the open to the closed position more frequently or in other words results in more frequent operation of the control thereby giving a more even control and preventing over-shooting and under-shooting of the desired temperature to the extent that would prevail if the thermostatic element responded primarily to the temperature of the frying pan.

By forming the heating element in a circle as shown and having its diameter related to that of the bottom of the frying pan in a predetermined manner dead spots, i.e., relatively cold spots, are completely eliminated and the bottom of the frying pan is heated substantially uniformly throughout. The relatively thick layer 16 of aluminum provided on the bottom of the frying pan facilitates this even heat distribution since it has a relatively high heat transfer coefficient. Moreover, since the heat transfer coefficient of aluminum is substantially higher than that of stainless steel this particular construction is effective to produce an even heat throughout the bottom of the frying pan while having the sides thereof being considerably cooler, resulting in decreased heat loss and a more efficiently operating utensil.

By constructing the thermostatic control device so that it can be merely plugged into the heating element when in use and disconnected therefrom when not in use, the frying pan may be washed without fear of damage to any electrical equipment since heating element 18 is itself entirely waterproof and prior to washing the thermostatic control device 32 and connecting plug 32 may be removed permitting complete immersion of the frying pan during the washing operation.

The invention in its broader aspects is not limited to the specific mechanism shown and described but departures may be made therefrom, within the scope of the accompanying claims, without departing from the principles of the invention and without sacrificing its chief advantages.

What is claimed is:

1. A cooking utensil comprising a container having a bottom, said container being fabricated of stainless steel with a facing of aluminum bonded to the outer surface of the bottom thereof, said aluminum having a substantially greater thickness than said stainless steel, a waterproof electrical heating element having a substantially smaller configuration than said bottom and bonded to said aluminum facing, said heating element having a pair of terminals in the form of parallel spaced prongs projecting outward of said container, adjustable temperature sensitive control means having a temperature sensitive element projecting therefrom for controlling said heating element effective to connect said heater with a power source and operative to control the output of said heater, said control means including a pair of electrical connectors complementary with said prongs and adapted to frictionally receive the same therewithin to establish a readily removable electrical connection therebetween, a metallic housing disposed generally intermediate the terminal ends of said heating element and secured in heat transfer relationship with said container, the temperature sensitive element of said control being disposed within said housing when said control is in its operative position with said connectors connected to said prongs.

2. A cooking utensil comprising a container to be heated, a heating element fixedly secured to the bottom of said container and having a pair of terminals extending therefrom, an elongated sleeve carried by said container in heat transfer relationship to said element, a detachable connector plug including a pair of terminals for cooperating with the first said terminals to energize said element and temperature control means carried by said connector, said control means including elongated temperature responsive means slidably enterable into and substantially wholly enclosed by said sleeve when the connector is in operative position on said device and switch means operable by said temperature responsive means for controlling the application of energy applied to said element for regulating the temperature of said container, said sleeve being disposed between the terminals of said element and said elongated temperature responsive means being disposed between said connector plug terminals and having a length substantially exceeding the distance between the connector plug and the container when the terminals on said plug and container are in initial meeting engagement.

3. A cooking utensil as described comprising a container having a waterproof electrical heating element on its underside, the ends of said heating element being disposed in spaced adjacent relation and terminating in a pair of outwardly projecting parallel spaced terminal prongs, said container further having a socket depending at least partially from its underside in thermal communication therewith, said socket being located between said spaced ends of the heating element and having its axis paralleling said prongs, and readily removable control means for connecting said heating element with a source of electrical power and operative to thermostatically control the passage of electrical power to said heating element, said control means embodying a housing having a pair of spaced prong receiving receptacles in one side thereof to frictionally receive the prongs and establish a readily detachable electrical connection therewith, said housing further having a hollow, rigid temperature sensing probe extending outwardly from said side of the housing and intermediate the prong receptacles for disposition within said socket when the prongs are frictionally received in said receptacles of the control means, a switch for making and breaking electrical contact of at least one of said receptacles with the power source, means within the temperature sensing probe for operating said switch in accordance with a change of temperature sensed by the temperature sensing probe, and adjustment means for varying the temperature at which said switch makes and breaks contact.

4. An electrically heated utensil for preparation of food and the like that may be completely submerged in water comprising a food receiving vessel having a bottom wall, and means for spacing said bottom wall off a supporting surface on which the utensil is set, a waterproof electric heating element extending over a substantial area of the bottom wall of the vessel to uniformly heat the same, the ends of said heating element being in adjacent spaced relation and terminating in a pair of parallel spaced terminal posts externally located on said vessel adjacent the bottom wall of the vessel for convenient access thereto, and a sleeve-like metallic housing carried by said bottom wall defining a temperature sensing zone having an entrance intermediate said terminal posts and extending between said posts and adjacent spaced ends of the heating element in substantially parallel relation to said posts whereby an electrical connection unit including terminal connection means, a heat responsive circuit interrupter and a temperature sensing probe operatively associated therewith may be conveniently assembled with said utensil to permit simultaneous temperature control and energization of the heating element and may be as conveniently separated therefrom to permit complete submerging of the utensil in water for washing purposes.

5. In a cooking utensil having a bottom portion and a sheathed heating element secured to and carried by said bottom portion, said heating element having a pair of end portions arranged adjoining an edge portion of the utensil in closely spaced relationship, said end portions terminating in a pair of terminals disposed in spaced parallel relationship, means defining a temperature sensing zone carried by said utensil in heat transfer relationship thereto and having an elongated opening therein, said means being in closely disposed relationship with said end portions of said heating element and in heat transfer relationship therewith, and a regulator for supplying energy to said heating element, said regulator including terminal means for electrically engaging the first said terminals to supply energy to the heating element, an elongated member slidably received in said opening and shielded from ambient air currents at the time of engagement of said terminals and terminal means, and means responsive to changes in temperature of said member to regulate the supply of energy to said heating element.

6. In a cooking utensil according to claim 5 wherein said elongated member is hollow and includes means at least partially disposed therein and movable in response to temperature changes of said member and said regulator includes make and break contacts responsive to movement of the last said means.

7. In a cooking utensil the combination of a metallic container, a waterproof electrical heating element bonded substantially throughout its length to the outer surface of the bottom of said container, said element including a conductor having its terminal ends in parallel laterally spaced relation, a regulator having a temperature responsive element for controlling the heat output of said heating element, said regulator being adjustable and having a pair of recesses complementary to the terminal ends of said conductor and adapted to frictionally receive the same therewithin and establishing an electrical connection between said regulator and said conductor that is readily removable, a metallic housing disposed adjacent the terminal ends of the heating element, the last said housing being in heat transfer relationship with said utensil and heating element and having an opening therein spaced from and in parallel relationship to said terminal ends, the temperature responsive element of said regulator being received within said hosuing at least as soon as the regulator is in its operative position with the terminal ends of said conductor received within said recesses.

8. An electrical heating device comprising means to be heated, electrical heating means therefor including electric terminals, means on said device including a body having an elongated double open-ended cavity and defining a temperature-sensing zone, said cavity being positioned between said terminals and with the cavity-defining wall being in integral heat conducting relationship with said means being heated and with said electrical heating means and electrical energy conducting and regulating means detachable from said device, said detachable means including terminals directly engageable with the first said terminals and a temperature-sensing projecting member, said member being of such a length that it will enter said zone at least as soon as engagement is made between said engageable terminals.

9. An electrical heating device comprising a member including a surface to be heated, electrical heating means for said member including electrical terminals, means on said member including a body having an elongated open-end cavity defining a temperature-sensing zone, said cavity being positioned between said terminals and having a diameter greater than the minimum thickness of said member, and electrical energy conducting and regulating means detachable from said device, said detachable means including terminals directly engageable with the first said terminals and a temperature-sensing projecting member, said member being of such length that it will enter said zone at least as soon as engagement is made between said engageable terminals.

10. A cooking utensil comprising a container having a bottom, said bottom having at least its outer surface formed of aluminum, a waterproof electrical heating element having a smaller configuration than said bottom and bonded to said aluminum surface, said heating element having a pair of terminals in the form of parallel spaced prongs projecting outward of said container, and an adjustable temperature sensitive control means having a temperature sensitive element projecting therefrom for controlling said heating element effective to connect said heater with a power source and operative to control the output of said heater, said control means including a pair of electrical connectors complementary with said prongs and adapted to frictionally receive the same therewithin to establish a readily removable electrical connection therebetween, a metallic housing disposed generally intermediate the terminal ends of said heating element and secured in heat transfer relationship with said bottom, the temperature sensitive element of said control being disposed within said housing when said control is in its operative position connected to said heater.

11. An electrically controlled immersible cooking utensil comprising a utensil body, electrical heating means in heat transfer relationship with said body for heating said body and having a pair of spaced electrical terminals, an elongated sleeve in heat transfer relationship with said utensil body, said sleeve defining a utensil temperature sensing zone, a detachable electrical connector having a pair of terminals adapted to engage said first named terminals for supplying electrical current to said heating element, a temperature responsive sensing member carried by said connector and projecting therefrom, said member being of such a length and adapted to enter said sleeve at least as soon as the terminals of said connector engage said heating element terminals and switch means in said connector actuated by said temperature sensing member for controlling the current flowing to said heating element.

12. An electrical heating device comprising a member to be heated, electrical heating means therefor including electric terminals, means on said device including a body having an elongated cavity provided with an opening defining a temperature-sensing zone, the portion of said body containing said cavity being positioned between said terminals, the dimension normal to said member of that portion of the body containing said cavity being greater than the minimum thickness of said member, and electrical energy conducting and regulating means detachable from said device, said detachable means including terminals directly engageable with the first said terminals, an energy supplying cable connected to said energy conducting and regulating means for supplying regulated energy to said heating means and a temperature-sensing projecting member, said member being of such length that it will enter said zone at least as soon as engagement is made between said engageable terminals.

13. An electrically controlled immersible cooking utensil comprising a utensil body, electrical heating means, means bonding said heating means to the bottom face of said utensil for heating the same, said heating means having a pair of spaced, parallel terminals projecting laterally of said utensil body, an elongated sleeve, means mounting said sleeve between said terminals and in parallel relationship therewith, said sleeve defining a utensil temperature sensing zone, the end of said sleeve adjacent said terminals terminating short of the extremities of said projecting terminals whereby said terminals extend from said utensil body beyond said sleeve, a detachable, temperature-regulated electrical connector having a pair of terminals adapted to engage said heating means terminals for supplying electrical current to said heating means, and a temperature responsive sensing member carried by said connector and projecting therefrom, said projecting member extending from said connector a distance greater than the distance said heating element terminals extend beyond said sleeve, said projecting member thereby being adapted to enter said sleeve at least as soon as the terminals of said connector engage said heating element terminals, said connector being operative to control the current to said heating element in response to the temperature of said utensil.

14. In an electrically heated vessel having a heat conductive metallic wall, the combination of a metal enclosed resistance heating element in heat transfer contact with said wall and having closely adjacent end portions and parallel terminal prongs by which power is supplied to said element, said terminal prongs extending clear of said wall, a metallic body carried by said vessel and in heat transfer relationship with the end portions of said heating element and provided with an elongated heat sensing cavity adjacent to said end portions and parallel with said terminal prongs, and an electrical energy supplying and regulating unit detachable from said vessel, said unit having terminals directly engageable with said terminal prongs, and a temperature sensing projecting member, said member being of such length that it will enter said cavity at least as soon as engagement is made between said terminals.

15. An electrical heating device comprising a member having a bottom wall to be heated, electrical heating means on said bottom wall in heat conductive relation therewith including a first set of electrical terminals conveniently located at the periphery of the bottom wall, and a heat conductive body on the underside of said bottom wall and having an elongated cavity therein disposed between said terminals, said body being in heat conducting relationship with said bottom wall, said heating means being waterproofed whereby the device including the heating means may be completely immersed in water, and means which may be readily detached from said device when the device is to be immersed in water, said detachable means including a second set of terminals directly engageable with the first set of terminals, and adjustable thermostatic control means connected with at least one of said second set of terminals for regulating the energizing of the said electrical heating means, said control means including a temperature sensing probe adapted to be disposed in said cavity when said two sets of terminals are in engagement, said temperature-sensing probe being so related to said terminals as to require said probe to be in heat transfer relationship within said cavity upon engagement of said two sets of terminals.

References Cited in the file of this patent

UNITED STATES PATENTS

| | | |
|---|---|---|
| Re. 20,570 | Bushway | Dec. 7, 1937 |
| 1,047,536 | Kercher | Dec. 17, 1912 |
| 1,431,542 | Ross | Oct. 10, 1922 |
| 1,481,233 | Sieben | Jan. 15, 1924 |
| 1,613,261 | Anthony | Jan. 4, 1927 |
| 1,662,817 | Bollmann et al. | Mar. 20, 1928 |
| 1,710,955 | Ufford | Apr. 30, 1929 |
| 1,720,837 | Hynes et al. | July 16, 1929 |
| 1,757,986 | Whittier | May 13, 1930 |
| 1,813,267 | Arnesen | July 7, 1931 |
| 1,930,551 | Blashfield | Oct. 17, 1933 |
| 2,164,813 | Gunther | July 4, 1939 |
| 2,213,722 | Smith | Sept. 3, 1940 |
| 2,258,989 | Liner | Oct. 14, 1941 |
| 2,285,776 | Maccoy | June 9, 1942 |
| 2,524,954 | Best | Oct. 10, 1950 |
| 2,571,782 | Swensen | Oct. 16, 1951 |
| 2,611,070 | Chandler | Sept. 16, 1952 |
| 2,703,358 | Mertler | Mar. 1, 1955 |
| 2,744,995 | Jepson | May 8, 1956 |
| 2,926,230 | Foster | Feb. 23, 1960 |

FOREIGN PATENTS

| | | |
|---|---|---|
| 17,453 | Great Britain | June 25, 1914 |
| 543,995 | Germany | Feb. 12, 1932 |
| 785,298 | France | May 13, 1935 |
| 99,642 | Sweden | Aug. 20, 1940 |
| 599,224 | Great Britain | Mar. 8, 1948 |
| 599,517 | Great Britain | Mar. 15, 1948 |
| 249,084 | Switzerland | Mar. 16, 1948 |
| 603,191 | Great Britain | June 10, 1948 |
| 648,211 | Great Britain | Jan. 3, 1951 |
| 474,502 | Canada | June 12, 1951 |
| 518,320 | Belgium | Mar. 31, 1952 |
| 1,065,595 | France | June 13, 1954 |
| 725,341 | Great Britain | Mar. 2, 1955 |